United States Patent [19]
Maiste

[11] 3,804,231
[45] Apr. 16, 1974

[54] CORN HEADER WITH VARIABLE SPEED POWER TRAIN FOR FEEDER

[75] Inventor: Arved Maiste, Ontario, Canada

[73] Assignee: White Motor Corporation of Canada, Limited, Brantford, Ontario, Canada

[22] Filed: Sept. 25, 1972

[21] Appl. No.: 291,890

[52] U.S. Cl............................ 198/174, 74/230.17 D
[51] Int. Cl........................ B65g 19/00, F16h 55/22
[58] Field of Search.................... 198/127, 174, 110; 74/230.17 R, 230.17 A, 230.17 C, 230.17 D; 56/DIG. 15

[56] References Cited
UNITED STATES PATENTS

| 475,628 | 5/1892 | Stombs............................ 198/127 R |
| 2,767,591 | 10/1956 | Schweickart................. 74/230.17 D |
| 2,858,012 | 10/1958 | Kepkay............................. 198/174 |

Primary Examiner—Richard E. Aegerter
Attorney, Agent, or Firm—Lockwood, Dewey, Zickert & Alex

[57] ABSTRACT

An apparatus for feeding crop material upwardly into a combine harvester which includes a feeder chain conveyor mounted in an upwardly inclined housing at the forward end of the combine and extending between a cross auger at the upper end of a crop gathering head and a point of entry to the main portion of the combine structure wherein a variable speed power train is provided for driving the feeder conveyor which is mounted outside the feeder housing and which comprises an upper shaft assembly having inner and outer shaft members with a power input pulley on one end of the inner shaft and an adjustable output sheave on the other end having a rotating cam-type variable speed control hub permitting the use of a single acting hydraulic cylinder for controlling sheave adjustment, which output sheave has a belt connection to a spring tensioned adjustable sheave on a variable speed countershaft on which there is a sprocket for a chain drive connection with a sprocket on the outer shaft member of the upper shaft assembly for driving the feeder chains and also an output sheave for driving connection with a main countershaft which is adapted to have driving connections with the cross auger and the gathering head.

13 Claims, 8 Drawing Figures

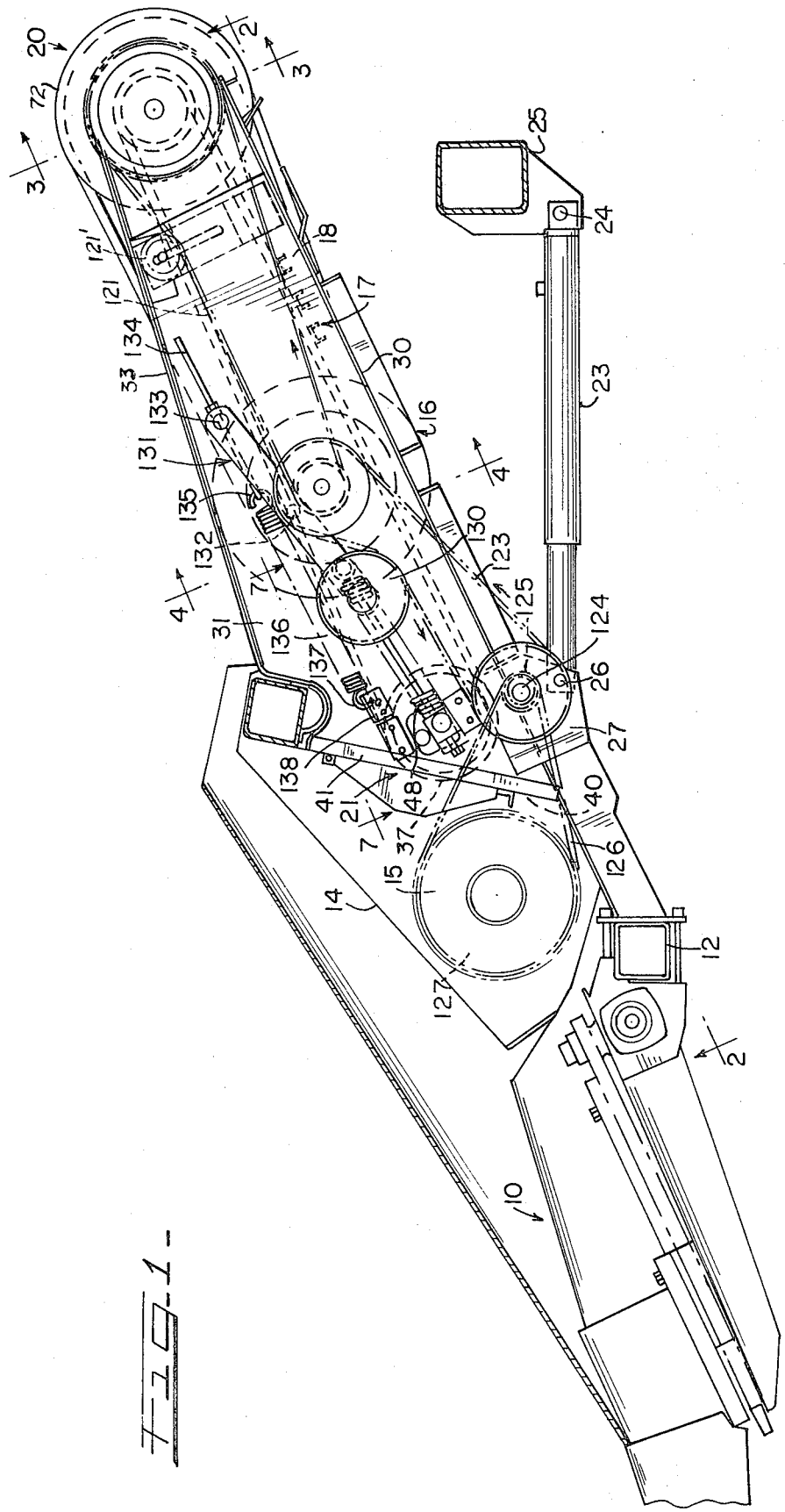

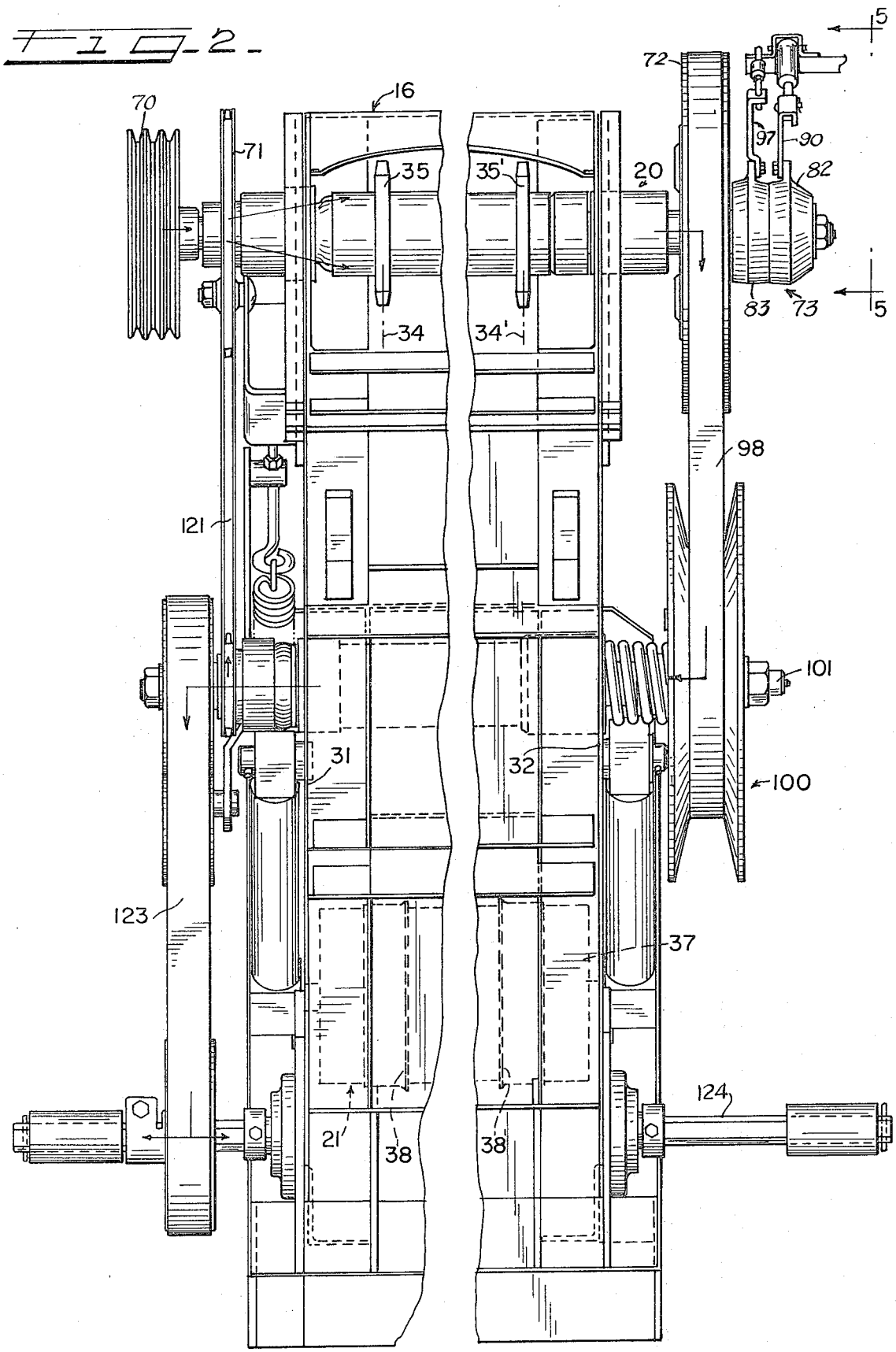

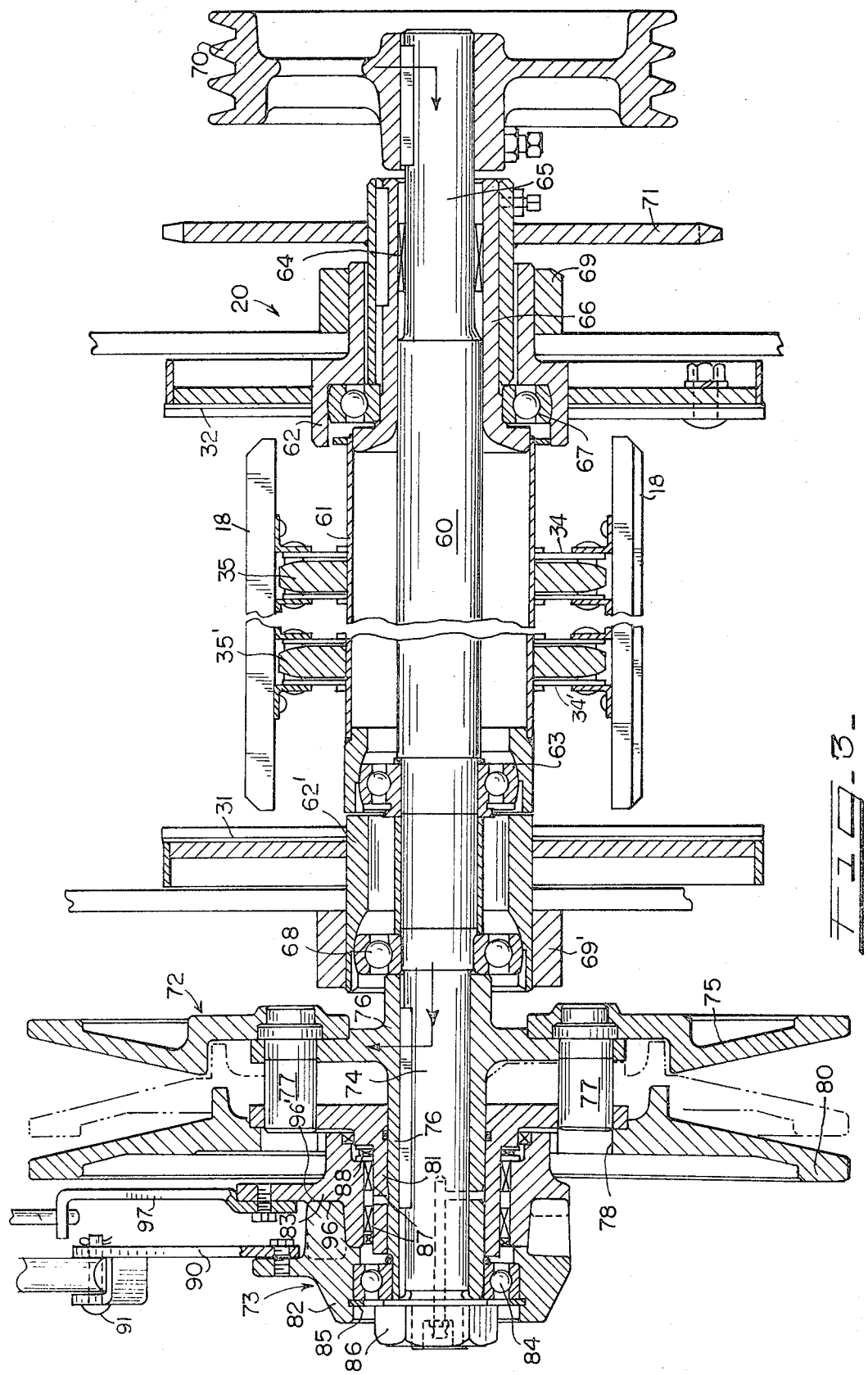

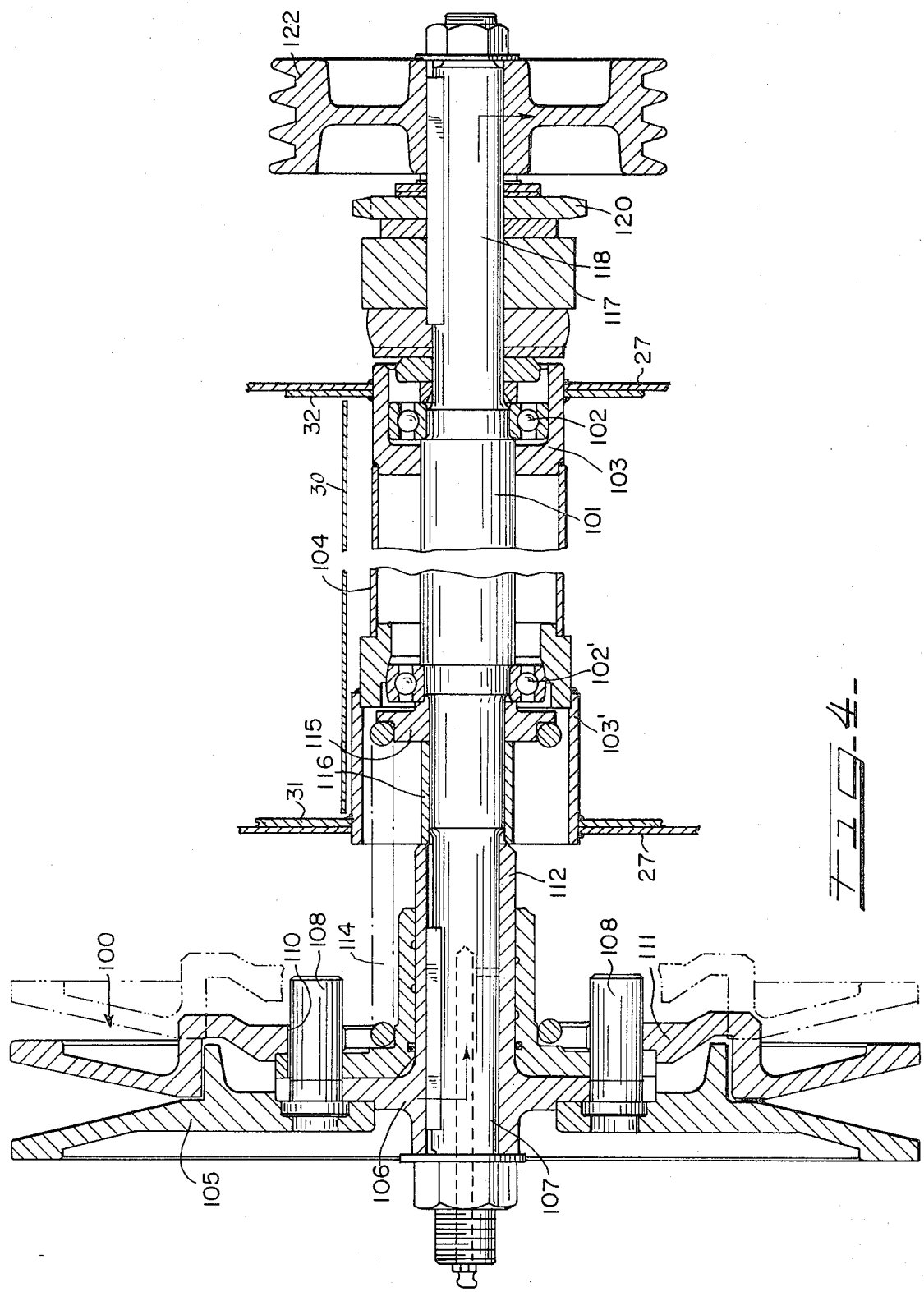

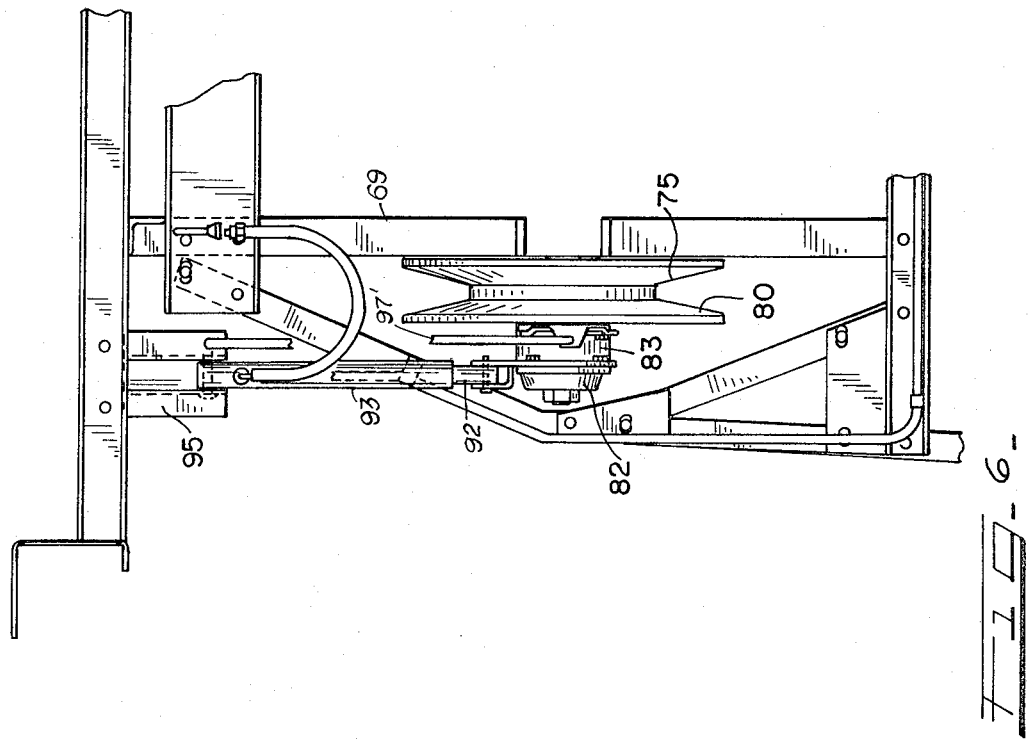
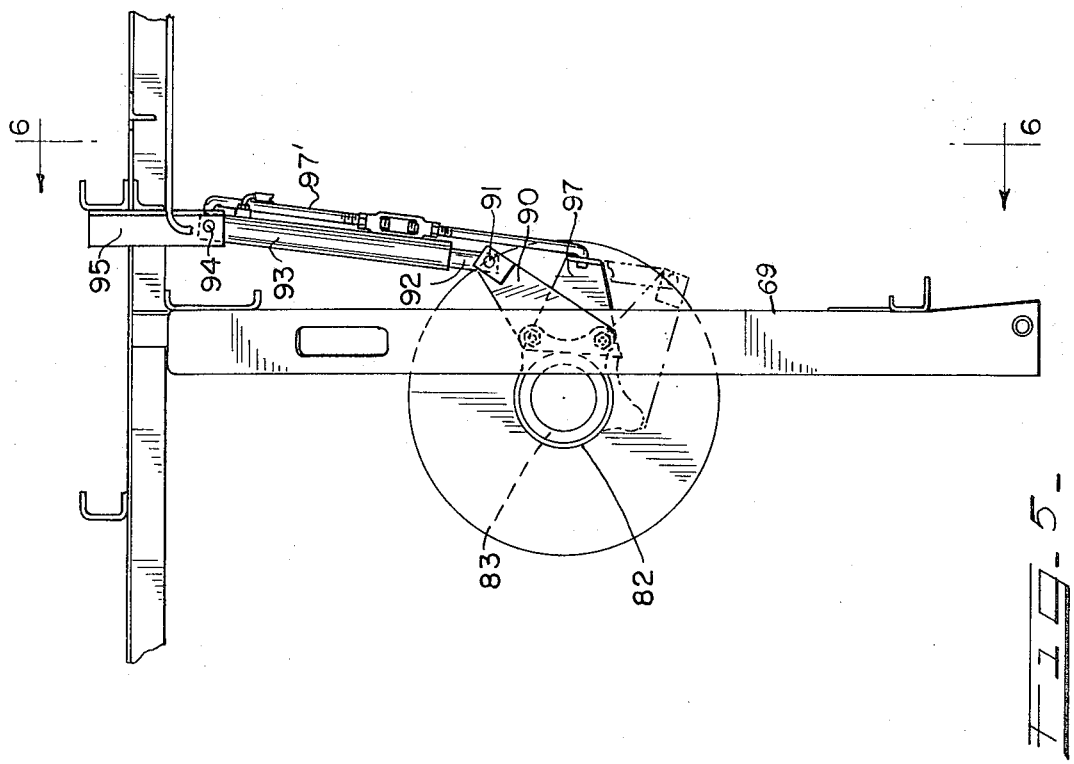

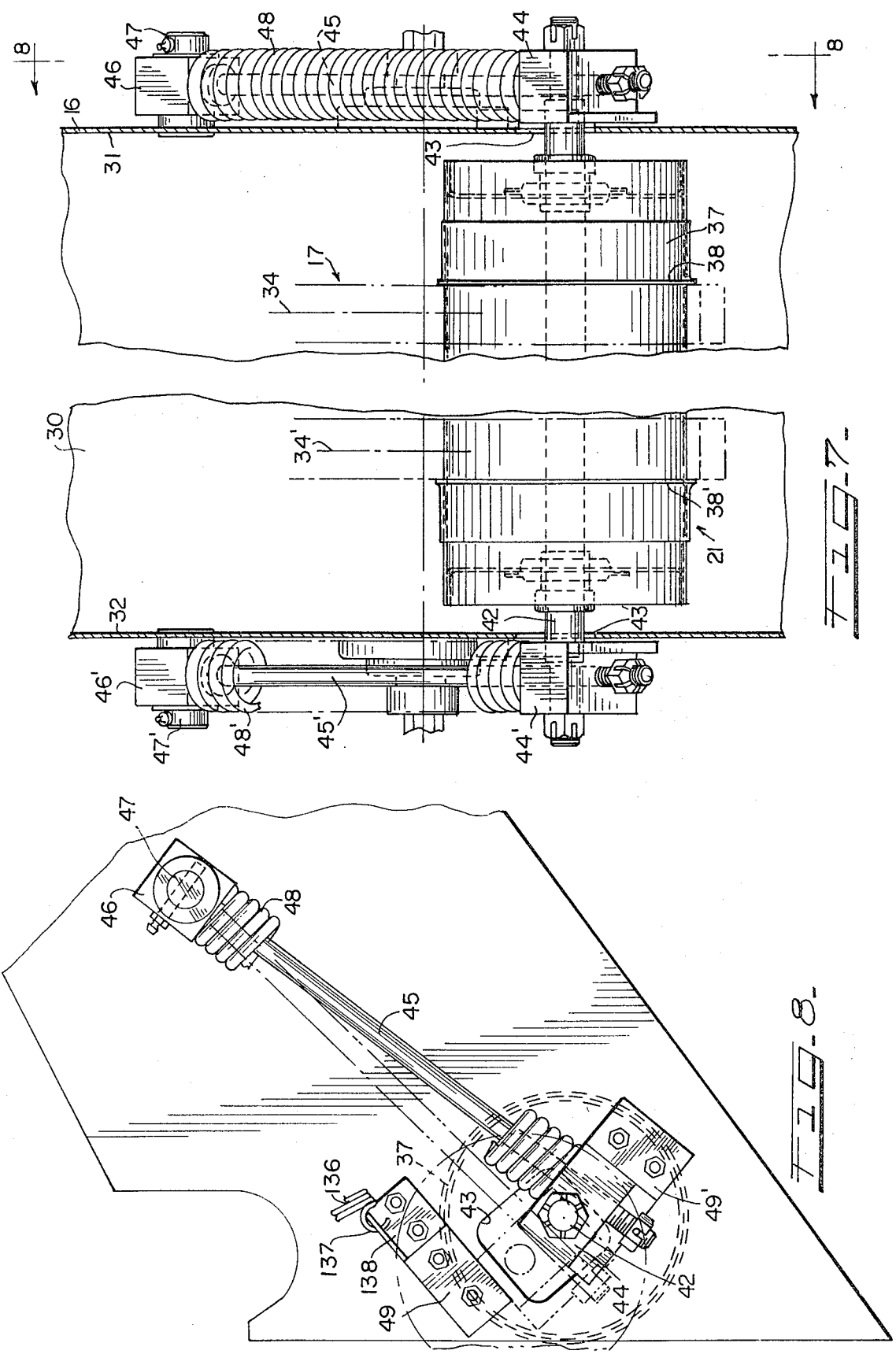

CORN HEADER WITH VARIABLE SPEED POWER TRAIN FOR FEEDER

This invention relates to agricultural machinery and is more particularly concerned with improvements in a power drive mechanism for a crop feeder mounted on a harvesting combine.

Crop harvesting combines have heretofore been provided with mechanism for receiving crop material picked up by a crop harvesting corn header and for advancing the same to an entry point which is at a higher level on the forward end of the frame structure of the combine where the material is delivered to the grain separating apparatus. Generally, the feeder apparatus is in the form of an upwardly inclined chute or housing in which there is mounted a conveyor of the slat carrying chain type serving as an elevator for advancing the gathered crop material along the upwardly inclined floor of the housing. In such a feeder arrangement the design of the drive for the feeder chain and associated elements has not been entirely satisfactory in all respects and it is a general object of the present invention to provide an improved arrangement for mounting and driving the feeder chain so as to automatically adjust for belt stretch and to compensate automatically for wear in the chain and the associated structural elements.

It is a more specific object of the invention to provide a crop feeder structure for a harvesting combine wherein a crop advancing slat carrying feeder chain conveyor is mounted in an upwardly inclined feeder housing at the forward end of a combine frame structure with provision for limited swinging movement, against resilient pressure, of the lower feeder chain shaft, so as to accommodate variations in the concentration of the crop material which is delivered to the feeder housing and to automatically compensate for wear in the chain assembly, and with provision for driving the feeder chain conveyor through a novel variable speed power drive arrangement.

It is a further object of the invention to provide a crop feeder structure for a combine harvester wherein a feeder chain conveyor is mounted in an upwardly inclined housing at the forward end of the combine frame on upper and lower feeder shafts so as to extend between a cross auger receiving the crop material from a gathering head and an infeed area for the separating and storage apparatus in the combine, with the lower feeder shaft mounted to swing upwards against resilient downward pressure and thereby allow greater than normal crop concentrations to pass without undue loading of the elevator drive components and wherein the upper feeder shaft is driven through a variable speed power train which utilizes both sides of the feeder housing so as to obtain a high degree of compactness and provide maximum tire clearance and which utilizes a variable speed sheave on the power input shaft with a control hub arrangement permitting the use of only one single acting hydraulic cylinder to actuate the control mechanism.

These and other objects and advantages of the invention will be apparent from a consideration of the corn header and associated drive mechanism which is shown by way of illustration, in the accompanying drawings, wherein:

FIG. 1 is a side elevational view, with portions broken away, of a corn header apparatus and an associated drive mechanism, which embodies the invention, the apparatus being shown as mounted on the front end of a harvesting combine;

FIG. 2 is a bottom plan view, taken on line 2—2 of FIG. 1, to a larger scale, which shows the feeder drive mechanism and controls therefor;

FIG. 3 is a cross sectional view, taken on the line 3—3 of FIG. 1, to an enlarged scale, and with portions broken away;

FIG. 4 is a cross sectional view, taken on the line 4—4 of FIG. 1, to an enlarged scale and with portions broken away or omitted;

FIG. 5 is a side elevational view taken on the line 5—5 of FIG. 2 to a somewhat smaller scale which shows the arrangement for operating the feeder drive control mechanism;

FIG. 6 is an elevational view taken on the line 6—6 of FIG. 5;

FIG. 7 is a view taken on the line 7—7 of FIG. 1, to a larger scale; and

FIG. 8 is a view taken on the line 8—8 of FIG. 7, with portions broken away.

Referring to FIGS. 1 and 2, there is illustrated an apparatus mounted at the front end of a corn harvesting combine which includes a corn harvesting header or gathering unit 10, which is mounted on a cross beam 12 and disposed in a downwardly and forwardly slanted or inclined position. An auger trough 14 having a transverse auger 15 is mounted immediately above the cross beam 12 so as to receive the material gathered by the header 10. The auger 15 operates to convey the material to the center of the trough 14, in a known manner, where it is delivered to the bottom end of an upwardly inclined housing 16, constituting a feeder chute, in which there is a feeder conveyor 17 with cross slats 18 for advancing the material in the housing 16. The conveyor 17 is carried at the upper end of the housing 16 on a top feeder shaft assembly 20, while the lower end is carried on a bottom feeder shaft assembly 21 at the lower end of the housing 16.

The crop gathering head 10 does not form a part of the present invention and will not be described in detail. Likewise the details of the cross auger trough and the auger 15 need not be described for an understanding of the present invention. However, these mechanisms, in the arrangement illustrated, are driven by suitable connection with the drive mechanism hereinafter described.

The feeder housing or chute structure 16 (FIGS. 1 to 4) is of generally rectangular cross section and extends in upwardly inclined relation from the cross auger trough 14 to an area within the main body of the harvesting combine, so as to deliver the harvested material into the machine for processing. The housing 16 is supported at its upper end on main frame portions of the machine (not shown). At its bottom end it is supported by means of a pair of laterally spaced extensible arms 23. The support arms 23 each have one end pivotally mounted at 24 on a cross beam 25 forming part of the main frame structure of the combine and the other end connected by pivot 26 to a bracket plate 27 depending below the housing 16. The housing 16 comprises a bottom structure 30 over which the harvested material is advanced by the lower run of the conveyor 17. It includes upstanding side walls 31, 32 and a top cover 33.

The chain and slat conveyor 17 which is supported in the feeder housing 16 comprises a pair of chains 34, 34' on which the cross slats 18 are carried. The chains 34, 34' are supported at the upper end of the housing 16 on sprockets 35, 35' (FIG. 2) which are mounted on the feeder shaft assembly 20. At the lower end of the housing 16 the conveyor chains 34, 34' are supported on the cylinder drum 37 which constitutes part of the lower or bottom feeder shaft assembly 21. The drum 37 has axially spaced peripheral guide members 38, 38' (FIG. 2) for holding the chains 34, 34' in proper lateral spacing and alignment.

The feeder shaft assembly 20 at the upper end of housing 16 is fixed at a predetermined distance above the bottom or floor 30 of the housing 16 while the bottom feeder shaft assembly 21 (FIGS. 7 and 8) is mounted for limited movement in a direction normal to the floor 30. The return run of the conveyor 17 which advances the material upwardly in the housing 16 is spaced above the floor 30 a sufficient distance to accommodate a normal amount or normal flow of material while at the same time some automatic adjustment of the vertical position of the bottom shaft assembly 21 is provided for, so as to accommodate the material when more than the normal amount enters the lower end of the housing 16 from the cross auger 15. The auger 15 delivers the material through the opening indicated at 40 in the housing front wall 41 and at times it may be bunched up so that clogging of the housing would otherwise result. The drum 37 which constitutes an idler support for the bottom end of the conveyor 17 is mounted on a cross shaft 42, the ends of which extend through apertures 43 and 43' (FIGS. 7 and 8) in the side walls 32 and 32 of the housing 16 and are carried in bearing block members 44 and 44', the latter being disposed outside the side walls 31 and 32 of the housing 16. The bearing block members 44 and 44' are mounted for sliding movement in an axial direction on the lower ends of support rods 45 and 45' positioned outwardly of the housing side walls 31 and 32. Compression springs 48 and 48' are mounted on the support rods 45 and 45' with their upper ends bearing against the pivot blocks 46, 46' and with their lower ends engaging the bearing blocks 44, 44'. The pivots 47 and 47' are located above the associated apertures 43 or 43' and in the direction of the upper shaft assembly 20 so that tension is applied through the drum 37 on the conveyor chains 34 and 34', and also, a downward component of force is applied through bearing blocks 44 and 44' to the bottom feeder shaft 42 so as to normally hold the same in the lowermost position in the apertures 43 and 43' while permitting upward movement thereof when bunched up material, or when an amount of material greater than is generally encountered under ordinary operating conditions, is fed beneath the drum 37. Top and bottom bumper blocks 49 and 49' are provided on the outside face of each of the side walls 31 and 32 of the housing 16 so as to define the limits of movement of the shaft assembly 21. The tension applying arrangement, that is, the support rods 45, 45', and compression springs 48, 48' together with the associated bearing blocks are mounted on the outside of the housing walls 31 and 32 where there is no interference with the advance of the material in the housing 16. The path of movement of the bearing blocks 44 and 44' is sufficient to accommodate a flow of material substantially greater than the amount of material which is likely to be fed to the housing 16 under normal harvesting conditions. The downward pressure on the bearing blocks 44 and 44' is sufficient to hold the lower run of the conveyor 17 at the proper distance from the floor 30 of the housing 16 to insure that the material delivered to the housing 16 will advance upwardly through the housing.

The conveyor 17 is driven from the top feeder shaft assembly 20 (FIG. 3) which is mounted at the upper end of the housing 16. The shaft assembly 20 comprises a rotatably mounted inner shaft 60 and a tubular outer shaft housing 61 which is rotatably mounted on the inner shaft 60 and which carries the supporting sprockets 35 and 35' for the chains 34 and 34'. The shaft assembly 20 is supported at opposite ends in bearing housings 62 and 62' which are fixed in the side walls 31 and 32 of the housing 16. The outer shaft member 61 is mounted at its one end for rotation on the inner shaft 60 by means of a bearing 63 which is disposed adjacent the inner end of the bearing housing 62' and at its opposite end by means of needle bearings 64 on an end portion 65 of the inner shaft 60 which is of reduced cross sectional diameter. The outer shaft member 61 has a bearing sleeve 66 on its end which is of reduced diameter and which extends through the bearing housing 62 and encompasses a portion of the inner shaft end 65. At this end of the assembly the bearing sleeve 66 on the outer shaft 61 is supported in a bearing 67 in the bearing housing 62. At the other end of the assembly a bearing 68 supports the inner shaft 60 in the bearing housing 62'. The two bearing housings 62 and 62' extend outside the side walls 31 and 32 of the feeder housing and are supported on frame members indicated at 69 and 69'. A pulley 70 is keyed to the end of the inner shaft 60 which provides for power input to the shaft 60 through a connection with the main power unit of the combine or any other suitable power source. A sprocket 71 is mounted on the bearing sleeve portion 66 of the outer shaft 61.

An adjustable sheave assembly 72 and an associated mechanism 73 for controlling the same is mounted on an extended end portion 74 of the inner shaft 60. The sheave assembly 72 (FIG. 3) comprises a sheave half 75 having a hub formation 76 which is keyed to the end portion 74 of the shaft 60. The sheave half 75 carries guide pins 77, spaced about the axis thereof, which are slidingly received in spaced apertures 78 in a movable sheave half 80, and which connect the two sheave halves 75 and 80 for simultaneous rotation when the inner shaft 60 is rotated. The sheave half 80 has a hub formation 81 mounted for axial sliding movement of the hub formation 76 so as to permit limited sliding movement of the sheave half 80 relative to the sheave half 75 which is in a fixed position on the inner shaft 60.

The outer ends of the hub formations 76 and 81 on the sheave halves 75 and 80, respectively, support outer and inner control hubs 82 and 83 constituting part of the control mechanism 73 for adjusting the assembly 72. The outer control hub formation 82 is mounted for rotational movement on the outer end of the hub formation 76 by means of a ball bearing assembly 84 which is retained in the hub formation 82 by washer 85 and locked on the inner shaft 60 by the washer and nut 86. The inner hub formation 83 is axially movable on the hub formation 81 and rides on needle bearing assemblies 87 with a thrust bearing and race assembly 88 interposed between the innermost face and an opposed outermost face portion of the hub member 76.

The outer hub formation 82 has a radially extending lever plate 90 (FIGS. 3, 5 and 6) attached thereto which is pivotally connected at 91 to the lower end of piston 92 forming part of a single acting hydraulic cylinder 93, the other end of the cylinder 93 being pivoted at 94 to a bracket 95 on the vehicle frame. The cylinder 93 is operative through operator control to rotate the hub formation 82, which, through the cooperating interengaging cam faces 96 and 96' (FIG. 3), moves the inner hub formation 83 axially of the inner shaft 60 so as to adjustably position the movable sheave half 80 relative to the fixed sheave half 75 thereby opening or closing the sheave halves. The inner hub formation 83 has a lever plate 97 (FIGS. 5 and 6) which extends radially therefrom and which is connected to one end of a restraining rod 97' the latter having its other end connected to the bracket 95. The restraining rod 97' is adjustable lengthwise and holds the inner hub formation 83 against rotation while permitting movement thereof axially on the inner shaft 60.

A drive belt 98 (FIG. 2) connects the sheave or pulley 72 with an adjustable pulley 100 on a variable speed countershaft 101 (FIG. 4) which is mounted by means of bearings 102 and 102' in cylindrical bearing support members 103 and 103' which are in turn mounted in the side walls 31 and 32 of the housing 16. The shaft 101 is located in an area intermediate the top feeder shaft assembly 20 and the bottom feeder shaft assembly 21. A housing forming tube 104 extends between the bearing support members 103 and 103'. The variable speed pulley or sheave assembly 100 comprises a sheave half 105 with a hub portion 106 which is fixed on the end 107 of the shaft 101 at one side of the machine. The sheave half 105 carries axially extending, circumferentially spaced guide pins 108 which extend through cooperating apertures 110 in the wall of a sheave half 111 having a hub portion 112 which is mounted for movement in an axial direction on the hub portion 106 so as to permit the movable sheave half 111 to slide on the hub 106 to open and close the sheave members. The movable sheave half 111 is normally held in closed position by compression spring 114 which surrounds the hub formations 106 and 112 and which has its inner end seated against a peripheral flange formation on a retainer ring 115 holding the bearing 102' in position on the shaft 101. A spacer sleeve 116 extends between the inner end of the hub formation 106 and the retainer ring 115. At the opposite end of the shaft 101 there is a safety and torque limiting clutch assembly 117 keyed to the end 118 of the shaft. A sprocket 120 is keyed to the shaft end 118 and connected by a chain 121 (FIGS. 1 and 2) with the sprocket 71 on the outer shaft member 61 of the upper shaft assembly 20 so as to drive the conveyor chains 34, 34' through the sprockets 35, 35'. An idler tensioning device 121' may be provided for chain 121. A pulley 122 is keyed on the end 118 of the shaft 101 and connected by belt assembly 123 with a main countershaft 124 for driving the latter.

The countershaft 124 may be sectionalized with suitable coupling, and as shown in FIG. 1, may have a pulley 125 connected by a drive belt 126 with a pulley 127 for driving the cross auger 15. A similar drive connection (not shown) may be employed for driving the gathering unit 10.

A tension idler 130 (FIG. 1) is provided for the belt 123 which is mounted on the lower end of an idler arm 131. The idler arm is pivoted at 132 and has its upper end connected by pivot 133 to a pull rod 134, the lower end of which is connected at 135 to a tension spring 136 with the latter having its lower end connected at 137 to a fixed anchor bracket 138 on the side wall 31. By adjusting the position of the pull rod 134 relative to the pivot 133 the tension on the belt 123 may be varied.

In the use of the apparatus the position of the movable sheave half 80 of the adjustable pulley assembly 72 is adjusted by operating the cam control hub assembly 73 through the hydraulic control cylinder 93 so as to rotate the hub 82 and move the hub 83 axially relative to the inner shaft member 60. The belt 98 connects the pulley assembly 72 with the adjustable pulley assembly 100 on the countershaft 101. The pulley 100 is automatically adjustable according to the tension in the belt 98 through the action of the spring 114. The pulley 122 at the other end of shaft 101 is connected by belt 123 with the main countershaft 124 for driving the latter. The sprocket 120 on the driven shaft 101 is connected by chain 121 with sprocket 71 on the outer shaft member 61 of the top shaft assembly 20 for driving the feeder conveyor.

The drive arrangement utilizes both sides of the feeder housing to accommodate the variable speed power train and provides optimum compactness with maximum tire clearance, the latter being advantageous when operating in muddy field conditions. The overhang of all power shafts is held to a minimum thereby reducing bearing loads, shaft deflection and misalignment between belt sheaves and chain sprockets. The variable speed sheaves serve to accommodate belt stretch without center distance adjustment or use of special tighteners.

I claim:

1. In an apparatus for feeding crop material from a crop gathering head into a harvesting combine, a feeder housing mounted in upwardly inclined relation at the forward end of the combine, said housing extending between a crop gathering head which is disposed at the bottom end of the housing and which is operative to feed harvested material to the entrance end of said housing, and a discharge area within the combine, a feeder chain conveyor mounted in said housing and having a run thereof which is positioned to travel in a path to advance the harvested material upwardly along the floor of said housing, a conveyor chain supporting and driving top shaft assembly at the upper end of said conveyor, and means for driving said conveyor comprising a variable speed power train having a driving connection with said top shaft assembly, said conveyor chain supporting and driving top shaft assembly comprising, an inner power input shaft and an outer conveyor driving shaft rotatably mounted on said inner shaft, said shafts constituting a part of said power train, a power input connection at one end of said inner shaft and conveyor chain supporting sprockets carried by said outer shaft.

2. In an apparatus for feeding crop material from a crop gathering head into a harvesting combine, a feeder housing mounted in upwardly inclined relation at the forward end of the combine, said housing extending between a crop gathering head which is disposed at the bottom end of the housing and which is operative to feed harvested material to the entrance end of said housing, and a discharge area within the combine, a feeder chain conveyor mounted in said housing and having a run thereof which is positioned to travel in a path to advance the harvested material upwardly along the floor of said housing, a conveyor chain supporting and driving top shaft assembly at the upper end of said conveyor, and means for driving said conveyor comprising a variable speed power train having a driving connection with said top shaft assembly, said chain supporting and driving top shaft assembly constituting a part of said power train and said top shaft assembly including an input power shaft and an output power shaft, said output power shaft having sprockets carrying said chain conveyor, said input power shaft having a connection at one end thereof with a power input means and an adjustable drive pulley at the other end thereof.

3. In an apparatus as set forth in claim 2 wherein said adjustable drive pulley has an associated cam operated mechanism for controlling the adjustment of said drive pulley.

4. In an apparatus as set forth in claim 2 wherein said adjustable drive pulley has a fixed sheave half and a movable sheave half with an associated cam means for controlling the axial position of said movable sheave half relative to the said fixed sheave half.

5. In an apparatus as set forth in claim 2 wherein said power train includes a bottom drive shaft and an intermediate countershaft, said countershaft having an adjustable pulley on the end thereof which corresponds to the pulley mounting end of said inner shaft of said top shaft assembly and which has a belt connection with the adjustable drive pulley on said inner shaft.

6. In an apparatus as set forth in claim 2 wherein said power train includes a countershaft disposed intermediate the top and bottom ends of said feeder housing, a pulley on said countershaft having a belt connection with said adjustable drive pulley on the top shaft assembly, which countershaft pulley is automatically adjustable to accommodate changes in belt tension.

7. A crop feeder mechanism for advancing crop material from a crop gathering head into a harvesting combine comprising a feeder housing supported in upwardly inclined relation at the forward end of the combine, said feeder housing having a bottom wall formation and upstanding laterally spaced endless traveling support members and cross bars carried thereon, a top shaft assembly and a bottom shaft assembly on which said cross bar support members are carried, said shaft assemblies being mounted on said housing side wall formations so that the bottom run of said feeder conveyor travels in a path which is spaced relative to said housing bottom wall so as to engage the crop material and advance it from a bottom entrance end of said housing to a discharge opening adjacent the top end of said housing, and a variable speed power train for driving said feeder conveyor which includes said top shaft assembly, said top shaft assembly comprising an inner shaft member having a connection with a power drive means and an outer shaft member supported on said inner shaft member for rotation thereon and connected in driving relation with said cross bar support members, a countershaft spaced from said top shaft assembly, an adjustable driving connection between said inner shaft member of said top shaft assembly and said countershaft and a driving connection between said countershaft and said outer shaft member of said top shaft assembly for driving said feeder conveyor.

8. A crop feeder mechanism as set forth in claim 7 wherein said adjustable driving connection between said inner shaft member and said countershaft includes a pulley on said inner shaft member having a sheave half fixed on said inner shaft member, a cooperating sheave half mounted for movement axially of said inner shaft member and means to adjust the position of said movably mounted sheave half.

9. A crop feeder mechanism as set forth in claim 7 wherein said adjustable driving connection between said inner shaft member and said countershaft includes an adjustable pulley on said inner shaft member and means for varying the effective diameter of said pulley.

10. A crop feeder mechanism as set forth in claim 7 wherein said adjustable driving connection between said inner shaft member and said countershaft includes a pulley on said countershaft which is constructed to automatically vary its effective diameter in response to changes in tension in the belt connecting it with said inner shaft member of said top shaft assembly.

11. A crop feeder mechanism as set forth in claim 7 wherein said countershaft is mounted intermediate the top and bottom ends of said feeder housing and wherein a cross shaft is mounted adjacent the bottom end of said feeder housing and a driving connection is provided between said countershaft and said cross shaft.

12. A crop feeder mechanism as set forth in claim 7 wherein said countershaft has a power input pulley having a sheave half fixed on said countershaft and a cooperating sheave half movably mounted on said countershaft and resilient means for urging said movable sheave half toward closed position whereby the effective diameter of said pulley is automatically adjusted in response to changes in belt tension.

13. A crop feeder mechanism as set forth in claim 12 wherein said resilient means for urging said movable sheave half toward closed position comprises a compression spring means.

* * * * *